A. A. PANNIER.
EAR TAG.
APPLICATION FILED NOV. 14, 1919.
1,376,223.
Patented Apr. 26, 1921.
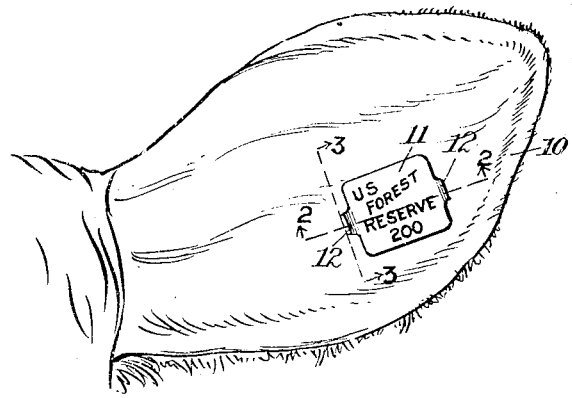
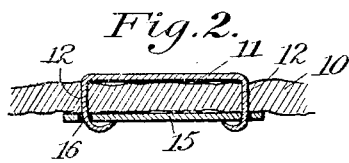
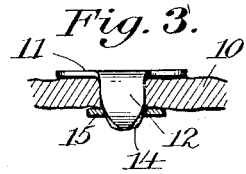
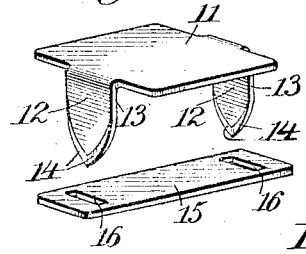
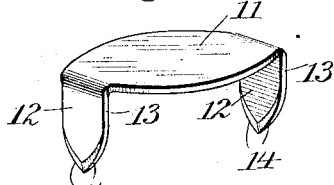
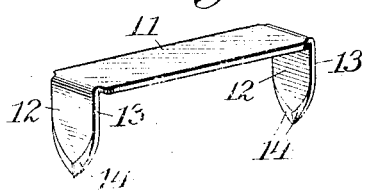
A.A. Pannier
INVENTOR

UNITED STATES PATENT OFFICE.

ARTHUR A. PANNIER, OF SALT LAKE CITY, UTAH.

EAR-TAG.

1,376,223. Specification of Letters Patent. Patented Apr. 26, 1921.

Application filed November 14, 1919. Serial No. 337,921.

*To all whom it may concern:*

Be it known that I, ARTHUR A. PANNIER, a citizen of the United States, residing at Salt Lake City, in the county of Salt Lake and State of Utah, have invented a new and useful Ear-Tag, of which the following is a specification.

This invention relates to ear tags.

The principal object of the invention is to provide an ear tag which will eliminate irritation of the cartilage of the ear, which might cause festering or disease.

A further object is to provide a tag which will be secure upon the ear, with no part projecting beyond the edge thereof to catch on fences or brush which might involve the loss of the tag.

Other objects are to provide an ear tag of light weight, capable of being manufactured in a wide variety of shapes, and of being secured to different parts of the ear, without causing pinching of the latter.

The invention will be best understood from a consideration of the following detailed description taken in connection with the accompanying drawings forming part of this specification, with the understanding, however, that the invention is not confined to any strict conformity with the showing of the drawings, but may be changed and modified, so long as such changes and modifications mark no material departure from the salient features of the invention as expressed in the appended claims.

In the drawing—

Figure 1 shows the device applied to an animal's ear;

Fig. 2 is a cross section on the line 2—2 of Fig. 1;

Fig. 3 is a cross section on the line 3—3 of Fig. 1;

Fig. 4 is a perspective view of the improved ear tag as it appears before being secured upon the ear;

Figs. 5 and 6 illustrate slight modifications in form of the insignia-bearing part of the ear tag.

The numeral 10 indicates an ear, which may be considered as illustrative of the ear of any animal. 11 indicates an insignia-bearing member or main plate which is preferably flat, of thin metal, and is of any shape desired.

The plate will preferably be made of aluminum, although other light non-oxidizable metals may be used. Suitable insignia, as names, numbers, etc., may be stamped on the plate, as Fig. 1 indicates. The plate 11 is provided at two opposite ends with prongs 12, which are shown as substantially flat, although narrower than the width of the plate. These prongs have straight, blunt or rounded edges 13 for a portion of their length, and beveled cutting or piercing edges 14 for the remainder of their length, which latter are curved or tapered to a point. It will be understood that the prongs 12 have an unvarying width down to where the rounded edges 13 merge into the sharpened edges 14.

The numeral 15 indicates a keeper-plate which is of like metal with the plate 11, though having a length somewhat greater. The keeper-plate 15 is provided with elongated transverse slots 16. These slots are so spaced and have such a width as to admit freely the ends of the prongs 12, but are of such a length as will allow the sharpened ends only of the prongs to pass therethrough. When the ends of the prongs are passed through the slots up to where the blunt edges 13 begin, they will go no farther, and the insignia plate 11 and the keeper-plate 15 are held spaced apart by a distance equal to the length of the blunt edges 13. In this manner there is no danger of pinching the ear when applying the tag.

The device is applied to the ear with the plate 11, bearing its insignia in plain sight. The keeper-plate too might be stamped if desired.

A suitable pair of pliers will force the sharpened ends of the prongs of the plate 11 through the ear and down through the slots of the keeper and then bend or clench them either toward or away from each other. When this has been done the sharpened edges 14 will lie entirely without the ear and the blunt edges will be retained within the same. This results in eliminating all irritation of the cartilage of the ear. Were any portion of the sharpened edges left in the ear, movement of the ear by the animal would result in a constant tendency to create soreness where the prongs pass through. This would give rise, in many cases, to festering, which might result in serious consequences.

The present ear tag is so made that the two separate parts, the plate and the keeper, when locked together present metal to metal, with no tendency to clamp or compress the animal's ear, as neither the plate 11 nor the keeper-plate 15 are brought tightly against the ear. Then too both parts of the tag lie flat upon the ear with no projecting parts or edges to catch in objects. Because the width of the blunt sections of the prongs is greater than the length of the slots, it is quite impossible for a pair of pliers, however manipulated, to bring the keeper and the plate so close together that permanent pressure upon or pinching of the ear is effected.

Another feature of the present invention is that the tag is secured at two points upon the ear, and does not hang from or project beyond the edge thereof. The ordinary ear tag is secured by a single prong, near the edge of an ear, and, projecting beyond the same, offers many opportunities for catching upon barbed wire, brush and the like. When this occurs, the animal will usually jerk away, whereupon the ear tag will be torn out, leaving a mutilated ear, causing the loss of the tag and necessitating the replacing of the same. The ordinary ear tag being attached to an edge of the ear, and the ear having more or less movement, is not readily distinguishable from others of its kind.

It will be understood that the three forms of the plate 11, illustrated in Figs. 4, 5 and 6, are merely suggestive of the infinite number and variety of shapes which might be given to such a plate. The prongs, instead of being substantially flat on both sides as shown, may be reinforced either inside or outside, or on both sides, provided that the width of the blunted sections of the prongs is such that they cannot be made to pass down through the slots, and that the invention is otherwise adhered to. An obvious modification of the construction illustrated would be to make the portion 13 of the prongs thicker, instead of wider, than the beveled portion 14, which would have the same effect of limiting the insertion of the prongs by allowing the sharpened or pointed ends only to pass through the slots. Any means to limit the insertion of the prongs is within the purview of this invention.

The present tag, as has been stated, is preferably made of aluminum, which cannot rust; is of very light weight; is easily stamped with any characters; and does not give rise to irritation of the ear.

The particular implement which is designed especially to affix the above-described ear tag upon the ears of live stock, is described and claimed in an application filed of even date herewith, Serial Number 337,922.

What is claimed is:

1. In an ear tag, a main plate, prongs integral with and bent at an angle from the edge of the plate, said prongs comprising flat portions with straight blunt edges and beveled portions with sharpened ear-piercing edges, and keeper means adapted to be locked to the plate on the other side of the ear by said prongs and spaced from the plate a distance determined by the length of said blunt edged portions of the prongs.

2. In an ear tag, a main plate, pointed prongs integral with the plate, and a keeper-plate having transverse slots to admit the prongs, said prongs comprising flat portions of the same width and thickness throughout with straight blunt edges, and portions with sharpened ear-piercing edges, said slots having such a length as to receive the pointed ends only of the prongs and to prevent the further passage of the prongs through the slots.

In testimony, that I claim the foregoing as my own, I have hereto affixed my signature in the presence of two witnesses.

ARTHUR A. PANNIER.

Witnesses:
RACHEL RUDY,
H. L. JAMES.